United States Patent
Hagawa et al.

(10) Patent No.: US 11,141,701 B2
(45) Date of Patent: Oct. 12, 2021

(54) COMPUTER-READABLE RECORDING MEDIUM ON WHICH CLOGGING LOCATION SPECIFICATION PROGRAM FOR SEPARATION MEMBRANE MODULE IS RECORDED, WATER PRODUCTION SYSTEM, AND WATER PRODUCTION METHOD

(71) Applicant: TORAY INDUSTRIES, INC., Tokyo (JP)

(72) Inventors: Kazuki Hagawa, Shiga (JP); Daishi Tateoka, Shiga (JP); Kazunori Tomioka, Shiga (JP); Masayuki Shintani, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 16/323,186

(22) PCT Filed: Aug. 4, 2017

(86) PCT No.: PCT/JP2017/028499
§ 371 (c)(1),
(2) Date: Feb. 4, 2019

(87) PCT Pub. No.: WO2018/026020
PCT Pub. Date: Feb. 8, 2018

(65) Prior Publication Data
US 2019/0184343 A1 Jun. 20, 2019

(30) Foreign Application Priority Data

Aug. 5, 2016 (JP) .............................. JP2016-154212
Aug. 10, 2016 (JP) .............................. JP2016-157225

(51) Int. Cl.
*B01D 61/22* (2006.01)
*B01D 63/02* (2006.01)
(Continued)

(52) U.S. Cl.
CPC ............. *B01D 65/10* (2013.01); *B01D 61/22* (2013.01); *B01D 63/02* (2013.01); *B01D 65/02* (2013.01);
(Continued)

(58) Field of Classification Search
CPC .... B01D 65/02; B01D 65/10; B01D 2321/40; C02F 2209/006
See application file for complete search history.

(56) References Cited

U.S. PATENT DOCUMENTS 6,161,435 A * 12/2000 Bond ..................... B01D 61/12
210/785
2011/0309038 A1 12/2011 Inoue
(Continued)

FOREIGN PATENT DOCUMENTS

CN   101088923 A   12/2007
CN   102316952 A    1/2012
(Continued)

OTHER PUBLICATIONS

Japanese Office Action, dated May 21, 2019, for Japanese Application No. 2018-532016, along with an English translation.
(Continued)

*Primary Examiner* — Bradley R Spies
(74) *Attorney, Agent, or Firm* — Birch, Stewart, Kolasch & Birch, LLP (57) ABSTRACT

The present invention relates to a computer-readable recording medium having recorded thereon a clogging location determination program for a separation membrane module, in which, in order to determine a clogging location of a
(Continued)

separation membrane module in a fresh water generation system for obtaining treated water by filtrating water to be treated by a separation membrane module having a separation membrane, a computer is caused to function as a clogging location determination means for determining a clogging location of the separation membrane module from a resistance in a lower part of the separation membrane module, a filtration resistance of a hollow-fiber membrane, and a resistance in an upper part of the separation membrane module.

7 Claims, 5 Drawing Sheets

(51) Int. Cl.
  *B01D 65/02* (2006.01)
  *B01D 65/08* (2006.01)
  *B01D 65/10* (2006.01)
  *C02F 1/44* (2006.01)

(52) U.S. Cl.
  CPC ............... *B01D 65/08* (2013.01); *C02F 1/44* (2013.01); *B01D 2311/24* (2013.01); *B01D 2313/48* (2013.01); *B01D 2321/04* (2013.01); *B01D 2321/16* (2013.01); *B01D 2321/18* (2013.01); *B01D 2321/40* (2013.01); *C02F 2209/006* (2013.01); *C02F 2209/03* (2013.01); *C02F 2303/16* (2013.01)

(56) References Cited

U.S. PATENT DOCUMENTS

| 2015/0306544 | A1 | 10/2015 | Park et al. |
| 2017/0216777 | A1 | 8/2017 | Aketagawa et al. |

FOREIGN PATENT DOCUMENTS

| CN | 104968421 A | 10/2015 |
| CN | 106794428 A | 5/2017 |
| JP | 9-262443 A | 10/1997 |
| JP | 11-19485 A | 1/1999 |
| JP | 11-169851 A | 6/1999 |
| JP | 2000-197884 A | 7/2000 |
| JP | 2002058969 A | 2/2002 |
| JP | 2010-207795 A | 9/2010 |
| JP | 2011-189287 A | 9/2011 |
| JP | 2011-212608 A | 10/2011 |
| JP | 2016-83640 A | 5/2016 |
| JP | 2016-87516 A | 5/2016 |
| JP | 2016-97357 A | 5/2016 |
| KR | 101612230 B1 | 4/2016 |
| WO | 2016/031331 A1 | 3/2016 |

OTHER PUBLICATIONS

International Search Report, issued in PCT/JP2017/028499, PCT/ISA/210, dated Sep. 12, 2017.
Written Opinion of the International Searching Authority, issued in PCT/JP2017/028499, PCT/ISA/237, dated Sep. 12, 2017.
Japanese Office Action, dated Feb. 5, 2019, for Japanese Application No. 2018-532016, along with an English translation.
Japanese Office Action, dated Mar. 2, 2021, for Japanese Application No. 2018-524142, along with an English translation.
Liu, Shuangjin, "6. Sulfonic acid membrane," Mar. 3, 2021, 5 pages total, with an English translation.
Chinese Office Action and Search Report for Chinese Application No. 201780048914.7, dated Mar. 31, 2021, with an English translation.
CNOA_2017800386831—dated Mar. 3, 2021; pp. 1-20.
CNOA_2017800386831—dated Jul. 1, 2021; pp. 1-22.

* cited by examiner

COMPUTER-READABLE RECORDING MEDIUM ON WHICH CLOGGING LOCATION SPECIFICATION PROGRAM FOR SEPARATION MEMBRANE MODULE IS RECORDED, WATER PRODUCTION SYSTEM, AND WATER PRODUCTION METHOD

TECHNICAL FIELD

The present invention relates to a separation membrane module for treating natural water such as river water, lake water and seawater, or sewage/wastewater and industrial wastewater, and a fresh water generation system.

BACKGROUND ART

A membrane separation method has characteristic features such as energy/space saving and enhancement of permeate quality and is therefore expanding its utilization in various fields. For example, a microfiltration or ultrafiltration membrane is applied to a water purification process of producing industrial water or tap water from river water, groundwater or sewage-treated water or is applied to a pretreatment in the seawater desalination reverse osmosis membrane treatment step or to a production process in the food industry field.

When water to be treated is subjected to membrane filtration, the amount of contaminants accumulated on the membrane surface, inside membrane pores and in the separation membrane module increases in association with the amount of water treated, and a reduction in the amount of water treated or an increase in the differential pressure becomes a problem.

Accordingly, physical cleaning has been put into practical use, such as air scrubbing in which air bubbles are introduced to the membrane primary side and the membrane is oscillated to contact the membranes with each other, thereby scraping off substances deposited on the membrane surface, backwashing in which treated water or clear water is forced to flow by pressure in a direction opposite the direction in the membrane filtration method so as to remove contaminants deposited on the membrane surface or inside membrane pores, and air scrubbing/backwashing simultaneous cleaning in which air scrubbing and backwashing are performed simultaneously.

Furthermore, in order to stably perform the membrane filtration continuous operation for a long period time, Patent Documents 1 and 2 have proposed a method in which the cleaning time of backwashing or the frequency of physical cleaning such as backwashing or air scrubbing is controlled in accordance with the measured value of membrane differential pressure during filtration.

BACKGROUND ART DOCUMENT

Patent Document

Patent Document 1: JP-A-11-169851
Patent Document 2: JP-A-11-019485

SUMMARY OF THE INVENTION

Problems that the Invention is to Solve

However, even when physical cleaning control described in Patent Documents 1 and 2 of controlling the cleaning time/frequency, etc. in accordance with the differential pressure of membrane filtration is conducted, there is a problem that only the same region within a separation membrane module is washed, generating an insufficient cleaning portion, and the membrane filtration operation cannot be satisfactorily stabilized.

An object of the present invention is to provide a fresh water generation system enabling stable operation by efficiently removing accumulated substances within a separation membrane module.

Means for Solving the Problems

In order to attain the object above, the present invention has the following features.

(1) A computer-readable recording medium having recorded thereon a clogging location determination program for a separation membrane module, in which, in order to determine a clogging location of a separation membrane module in a fresh water generation system for obtaining treated water by filtrating water to be treated by a separation membrane module having a separation membrane, a computer is caused to function as a clogging location determination means for determining a clogging location of the separation membrane module from a resistance in a lower part of the separation membrane module, a filtration resistance of a hollow-fiber membrane, and a resistance in an upper part of the separation membrane module.

(2) The computer-readable recording medium according to (1), in which the computer is caused to function as:

a difference computing means for computing a difference in a resistance between an inlet side and an outlet side on a primary side of the separation membrane module in a step of feeding water to be treated to the primary side of the separation membrane module (first resistance R1), a difference in a resistance between the inlet side on the primary side and a secondary side of the separation membrane module in a filtration step of pressure-feeding water to be treated from the primary side to the secondary side of the separation membrane module (second resistance R2), and a difference in a resistance between the inlet side and the outlet side on the primary side of the separation membrane module in a backwashing step of performing permeation from the secondary side to the primary side of the separation membrane module (third resistance R3); and a clogging location determination means for determining the clogging location of the separation membrane module from computing operations of R1−R3 and R2−(R1−R3) using the first resistance R1, the second resistance R2 and the third resistance R3 obtained by the difference computing means.

(3) The computer-readable recording medium according to (1), in which the computer is caused to function as:

a difference computing means for computing a difference in a resistance between an inlet side and an outlet side on a primary side of the separation membrane module in a step of feeding water to be treated to the primary side of the separation membrane module (first resistance R1), a difference in a resistance between the inlet side on the primary side and a secondary side of the separation membrane module in a filtration step of pressure-feeding water to be treated from the primary side to the secondary side of the separation membrane module (second resistance R2), and a difference in a resistance between the secondary side and the outlet side on the primary side of the separation membrane module in a backwashing step of performing permeation from the secondary side to the primary side of the separation membrane module (third resistance R3'); and a clogging location determination means for determining the clogging location of the separation membrane module from computing operations of (R1+R2)−R3', (R1+R3')−R2 and (R2+R3')−R1 using the first resistance R1, the second resistance R2 and the third resistance R3' obtained by the difference computing means.

(4) The computer-readable recording medium according to (2) or (3), in which the difference computing means uses pressure data.

(5) The computer-readable recording medium according to (2) or (4), in which the computer is caused to function as:

a variation recording means for recording a variation from an initial value of R1−R3, a variation from an initial value of R2−(R1−R3), and a variation from an initial value of R3;

a variation comparison means for comparing the variations recorded by the variation recording means; and further a control means for selecting, when the variation comparison means produces a result that the variation from the initial value of R1−R3 is larger than the variation from the initial value of R2−(R1−R3) and the variation from the initial value of R3, at least one of control a of performing air scrubbing while making a liquid level on the primary side within the separation membrane module to fluctuate up and down, control b of increasing a process time of a draining step, and control c of performing, in the draining step, pressure draining of draining water by pressurizing the primary side of the separation membrane module with air.

(6) The computer-readable recording medium according to (2) or (4), in which the computer is caused to function as:

a change rate recording means for recording a change rate from an initial value of R1−R3, a change rate from an initial value of R2−(R1−R3), and a change rate from an initial value of R3;

a change rate comparison means for comparing the change rates recorded by the change rate recording means; and further a control means for selecting, when the change rate comparison means produces a result that the change rate from the initial value of R1−R3 is larger than the change rate from the initial value of R2−(R1−R3) and the change rate from the initial value of R3, at least one of control a of performing air scrubbing while making a liquid level on the primary side within the separation membrane module to fluctuate up and down, control b of increasing a process time of a draining step, and control c of performing, in the draining step, pressure draining of draining water by pressurizing the primary side of the separation membrane module with air.

(7) The computer-readable recording medium according to (2) or (4), in which the computer is caused to function as:

a variation recording means for recording a variation from an initial value of R1−R3, a variation from an initial value of R2−(R1−R3), and a variation from an initial value of R3;

a variation comparison means for comparing the variations recorded by the variation recording means; and further a control means for selecting, when the variation comparison means produces a result that the variation from the initial value of R3 is larger than the variation from the initial value of R1−R3 and the variation from the initial value of R2−(R1−R3), at least one of control d of feeding water to be treated in a reverse direction through a nozzle of the separation membrane module, which is used for discharging cleaning drainage, and control e of cleaning the separation membrane module by operating a backwashing pump after discharging and emptying water on the primary side of the separation membrane module.

(8) The computer-readable recording medium according to (2) or (4), in which the computer is caused to function as:

a change rate recording means for recording a change rate from an initial value of R1−R3, a change rate from an initial value of R2−(R1−R3), and a change rate from an initial value of R3;

a change rate comparison means for comparing the change rates recorded by the change rate recording means; and further a control means for selecting, when the change rate comparison means produces a result that the change rate from the initial value of R3 is larger than the change rate from the initial value of R1−R3 and the change rate from the initial value of R2−(R1−R3), at least one of control d of feeding water to be treated in a reverse direction through a nozzle of the separation membrane module, which is used for discharging cleaning drainage, and control e of cleaning the separation membrane module by operating a backwashing pump after discharging and emptying water on the primary side of the separation membrane module.

(9) The computer-readable recording medium according to (2) or (4), in which the computer is caused to function as:

a variation recording means for recording a variation from an initial value of R1−R3, a variation from an initial value of R2−(R1−R3), and a variation from an initial value of R3;

a variation comparison means for comparing the variations recorded by the variation recording means; and further a control means for selecting, when the variation comparison means produces a result that the variation from the initial value of R2−(R1−R3) is larger than the variation from the initial value of R1−R3 and the variation from the initial value of R3, at least one of control f of conducting cleaning of the separation membrane module by feeding a chemical solution to the separation membrane module, control g of changing at least one of a backwashing time and an air scrubbing time, and control h of changing at least one of a backwashing flow rate in the backwashing step and an air amount in an air scrubbing step.

(10) The computer-readable recording medium according to (2) or (4), in which the computer is caused to function as:

a change rate recording means for recording a change rate from an initial value of R1−R3, a change rate from an initial value of R2−(R1−R3), and a change rate from an initial value of R3;

a change rate comparison means for comparing the change rates recorded by the change rate recording means; and further a control means for selecting, when the change rate comparison means produces a result that the change rate from the initial value of R2−(R1−R3) is larger than the change rate from the initial value of R1−R3 and the change rate from the initial value of R3, at least one of control f of conducting cleaning of the separation membrane module by feeding a chemical solution to the separation membrane module, control g of changing at least one of a backwashing time and an air scrubbing time, and control h of changing at least one of a backwashing flow rate in the backwashing step and an air amount in an air scrubbing step.

(11) The computer-readable recording medium according to any one of (2) to (4), in which the computer is caused to further function as:

an operation data recording means for recording operation data of the filtration step and the cleaning step; and a recording period setting means for setting an operation data recording period to periods different between the filtration step and the cleaning step.

(12) The computer-readable recording medium according to any one of (1) to (11), in which the computer is caused to further function as:

a pressure data recording means for recording a pressure difference of the separation membrane module;

a filtration flow velocity data recording means for recording a filtration flow velocity in the filtration step of pressure-feeding water to be treated from the primary side to the secondary side of the separation membrane module;

a prediction means for predicting a timing of chemical cleaning or replacement of the separation membrane module based on the data of the filtration flow velocity data recording means or the pressure data recording means;

an analysis means for analyzing a filtration index of either filtration differential pressure change or filtration flow velocity change recorded by the filtration flow velocity data recording means or the pressure data recording means; and a prediction means for predicting a change in filtration characteristics of either filtration pressure or filtration flow velocity from the filtration index obtained by the analysis means.

(13) The computer-readable recording medium according to (12), in which the prediction means has a function of graphically displaying a basic prediction curve and periodically making a new prediction according to the change in the filtration flow velocity or in the pressure difference.

(14) The computer-readable recording medium according to (12) or (13), in which the computer is caused to function as a warning means for outputting a warning alarm when the number of days until a chemical cleaning date or replacement date of the separation membrane calculated by the prediction means falls below the designated number of days.

(15) A fresh water generation system for obtaining treated water by filtrating water to be treated by a separation membrane module having a separation membrane, in which the fresh water generation system includes a computer and the computer is caused to function as a clogging location determination means for determining a clogging location of the separation membrane module from a resistance in a lower part of the separation membrane module, a filtration resistance of a hollow-fiber membrane, and a resistance in an upper part of the separation membrane module.

(16) The fresh water generation system according to (15), in which the computer is caused to function as a difference computing means for computing a difference in a resistance between an inlet side and an outlet side on a primary side of the separation membrane module in a step of feeding water to be treated to the primary side of the separation membrane module (first resistance R1), a difference in a resistance between the inlet side on the primary side and a secondary side of the separation membrane module in a filtration step of pressure-feeding water to be treated from the primary side to the secondary side of the separation membrane module (second resistance R2), and a difference in a resistance between the inlet side and the outlet side on the primary side of the separation membrane module in a backwashing step of performing permeation from the secondary side to the primary side of the separation membrane module (third resistance R3), and the clogging location of the separation membrane module is determined from computing operations of R1−R3 and R2−(R1−R3) using the first resistance R1, the second resistance R2 and the third resistance R3 obtained by the difference computing means.

(17) The fresh water generation system according to (15), in which the computer is caused to function as a difference computing means for computing a difference in a resistance between an inlet side and an outlet side on a primary side of the separation membrane module in a step of feeding water to be treated to the primary side of the separation membrane module (first resistance R1), a difference in a resistance between the inlet side on the primary side and a secondary side of the separation membrane module in a filtration step of pressure-feeding water to be treated from the primary side to the secondary side of the separation membrane module (second resistance R2), and a difference in a resistance between the secondary side and the outlet side on the primary side of the separation membrane module in a backwashing step of performing permeation from the secondary side to the primary side of the separation membrane module (third resistance R3), and the clogging location of the separation membrane module is determined from computing operations of (R1+R2)−R3', (R1+R3')−R2 and (R2+R3')−R1 using the first resistance R1, the second resistance R2 and the third resistance R3' obtained by the difference computing means.

(18) The fresh water generation system according to (16) or (17), in which the difference computing means uses pressure data.

(19) The fresh water generation system according to (16) or (18), in which, when a variation from an initial value of R1−R3 is larger than a variation from an initial value of R2−(R1−R3) and a variation from an initial value of R3 as a result of comparison of the variation from the initial value of R1−R3, the variation from the initial value of R2−(R1−R3) and the variation from the initial value of R3, at least one of control a of performing air scrubbing while making a liquid level on the primary side within the separation membrane module to fluctuate up and down, control b of increasing a process time of a draining step, and control c of performing, in the draining step, pressure draining of draining water by pressurizing the primary side of the separation membrane module with air, is conducted.

(20) The fresh water generation system according to (16) or (18), in which, when a change rate from an initial value of R1−R3 is larger than a change rate from an initial value of R2−(R1−R3) and a change rate from an initial value of R3 as a result of comparison of the change rate from the initial value of R1−R3, the change rate from the initial value of R2−(R1−R3) and the change rate from the initial value of R3, at least one of control a of performing air scrubbing while making a liquid level on the primary side within the separation membrane module to fluctuate up and down, control b of increasing a process time of a draining step, and control c of performing, in the draining step, pressure draining of draining water by pressurizing the primary side of the separation membrane module with air, is conducted.

(21) The fresh water generation system according to (16) or (18), in which, when a variation from an initial value of R3 is larger than a variation from an initial value of R1−R3 and a variation from an initial value of R2−(R1−R3) as a result of comparison of the variation from the initial value of R1−R3, the variation from the initial value of R2−(R1−R3) and the variation from the initial value of R3, at least one of control d of feeding water to be treated in a reverse direction through a nozzle of the separation membrane module, which is used for discharging cleaning drainage, and control e of cleaning the separation membrane module by operating a backwashing pump after discharging and emptying water on the primary side of the separation membrane module, is conducted.

(22) The fresh water generation system according to (16) or (18), in which, when a change rate from an initial value of R3 is larger than a change rate from an initial value of R1−R3 and a change rate from an initial value of R2−(R1−R3) as a result of comparison of the change rate from the initial value of R1−R3, the change rate from the initial value of R2−(R1−R3) and the change rate from the initial value of R3, at least one of control d of feeding water to be treated in a reverse direction through a nozzle of the separation membrane module, which is used for discharging cleaning drainage, and control e of cleaning the separation membrane module by operating a backwashing pump after discharging and emptying water on the primary side of the separation membrane module, is conducted.

(23) The fresh water generation system according to (16) or (18), including: a variation recording means for recording a variation from an initial value of R1−R3, a variation from an initial value of R2−(R1−R3), and a variation from an initial value of R3; and a variation comparison means for comparing the variations recorded by the variation recording means, in which, when the variation comparison means produces a result that the variation from the initial value of R2−(R1−R3) is larger than the variation from the initial value of R1−R3 and the variation from the initial value of R3, at least one of control f of conducting cleaning of the separation membrane module by feeding a chemical solution to the separation membrane module, control g of changing at least one of a backwashing time and an air scrubbing time, and control h of changing at least one of a backwashing flow rate in the backwashing step and an air amount in an air scrubbing step, is conducted.

(24) The fresh water generation system according to (16) or (18), including: a change rate recording means for recording a change rate from an initial value of R1−R3, a change rate from an initial value of R2−(R1−R3), and a change rate from an initial value of R3; and a change rate comparison means for comparing the change rates recorded by the change rate recording means, in which, when the change rate comparison means produces a result that the change rate from the initial value of R2−(R1−R3) is larger than the change rate from the initial value of R1−R3 and the change rate from the initial value of R3, at least one of control f of conducting cleaning of the separation membrane module by feeding a chemical solution to the separation membrane module, control g of changing at least one of a backwashing time and an air scrubbing time, and control h of changing at least one of a backwashing flow rate in the backwashing step and an air amount in an air scrubbing step is conducted.

(25) A fresh water generation method for obtaining treated water by filtrating water to be treated by a separation membrane module having a separation membrane, in which a clogging location of the separation membrane module is determined from a resistance in a lower part of the separation membrane module, a filtration resistance of a hollow-fiber membrane, and a resistance in an upper part of the separation membrane module.

(26) The fresh water generation method according to (25), in which a difference in a resistance between an inlet side and an outlet side on a primary side of the separation membrane module in a step of feeding water to be treated to the primary side of the separation membrane module (first resistance R1), a difference in a resistance between the inlet side on the primary side and a secondary side of the separation membrane module in a filtration step of pressure-feeding water to be treated from the primary side to the secondary side of the separation membrane module (second resistance R2), and a difference in a resistance between the inlet side and the outlet side on the primary side of the separation membrane module in a backwashing step of performing permeation from the secondary side to the primary side of the separation membrane module (third resistance R3) are computed, and the clogging location of the separation membrane module is determined from computing operations of R1−R3 and R2−(R1−R3) using the computed first resistance R1, second resistance R2 and third resistance R3.

(27) The fresh water generation method according to (25), in which a difference in a resistance between an inlet side and an outlet side on a primary side of the separation membrane module in a step of feeding water to be treated to the primary side of the separation membrane module (first resistance R1), a difference in a resistance between the inlet side on the primary side and a secondary side of the separation membrane module in a filtration step of pressure-feeding water to be treated from the primary side to the secondary side of the separation membrane module (second resistance R2), and a difference in a resistance between the secondary side and the outlet side on the primary side of the separation membrane module in a backwashing step of performing permeation from the secondary side to the primary side of the separation membrane module (third resistance R3') are computed, and the clogging location of the separation membrane module is determined from computing operations of (R1+R2)−R3', (R1+R3')−R2 and (R2+R3')−R1 using the computed first resistance R1, second resistance R2 and third resistance R3'.

(28) The fresh water generation method according to (25), in which a difference in a resistance between an inlet side and an outlet side on a primary side of the separation membrane module in a step of feeding water to be treated to the primary side of the separation membrane module (first resistance R1), a difference in a resistance between the inlet side on the primary side and a secondary side of the separation membrane module in a filtration step of pressure-feeding water to be treated from the primary side to the secondary side of the separation membrane module (second resistance R2), and a resistance on the inlet side of the primary side calculated from a draining time in a draining step of draining water on the primary side of the separation membrane module (fourth resistance R4) are computed, and the clogging location of the separation membrane module is determined from computing operations of R1−R4 and R2−R4 using the computed first resistance R1, second resistance R2 and fourth resistance R4.

(29) The fresh water generation method according to (26), in which, in the difference computing operation, the first resistance R1, the second resistance R2 and the third resistance R3 are calculated based on pressure data by keeping a permeation flux constant.

(30) The fresh water generation method according to (27), in which, in the difference computing operation, the first resistance R1, the second resistance R2 and the third resistance R3' are calculated based on pressure data by keeping a permeation flux constant.

(31) The fresh water generation method according to (28), in which, in the difference computing operation, the first resistance R1, the second resistance R2 and the fourth resistance R4 are calculated based on pressure data by keeping a permeation flux constant.

Advantage of the Invention

According to the recording medium and fresh water generation system of the present invention, in which a clogging location determination program for a separation membrane module is provided, the clogging location within a separation membrane module can be determined, and treated water can be stably obtained over a long period of time by efficiently cleaning the separation membrane module.

MODE FOR CARRYING OUT THE INVENTION

The present invention is described in greater detail below based on the embodiments illustrated in the drawings. However, the present invention is not limited to the following embodiments.

Figure 1:
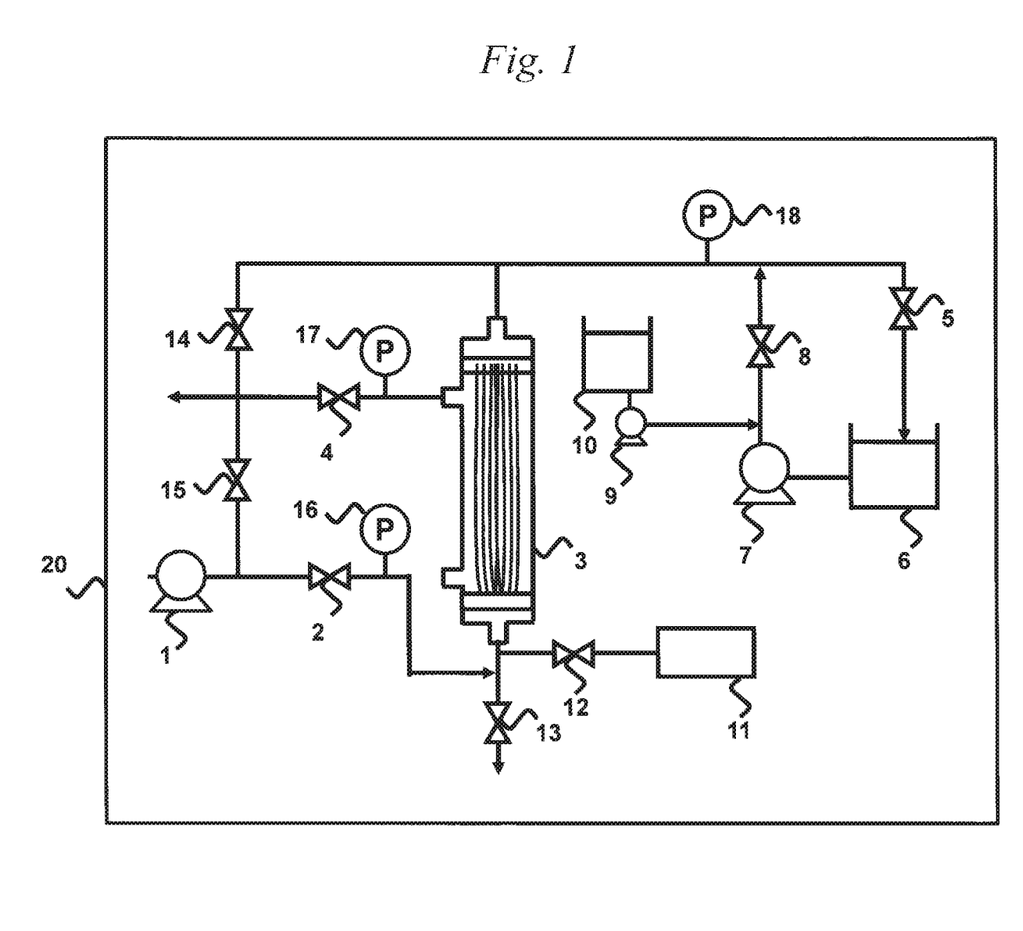
FIG. 1 is a schematic flow diagram of an apparatus illustrating one example of the fresh water generation system and the fresh water generation method, to which the present invention is applied.

The present invention relates to a computer-readable recording medium having recorded thereon a program for determining a clogging location of a separation membrane module, a fresh water generation system, and a fresh water generation method. In an apparatus to which the present invention is applied, for example, as illustrated in FIG. 1, a water to be treated feed pump 1 for feeding water to be treated, a water to be treated feed valve 2 that is opened when feeding water to be treated, a separation membrane module 3 for filtrating water to be treated, an air vent valve 4 that is opened when performing backwashing or air scrubbing, a treated water discharge valve 5 that is opened at the time of membrane filtration, a treated water storage tank 6 for storing treated water, a backwashing pump 7 for performing backwashing by feeding treated water to the separation membrane module 3, a backwashing valve 8 that is opened when performing backwashing, a chemical solution feed pump 9 for feeding a chemical solution to water to be treated or to the separation membrane module, a chemical solution storage tank 10 for storing a chemical solution, an air blower 11 as an air supply source for air scrubbing of the separation membrane module 3, an air scrubbing valve 12 that is opened when performing air scrubbing by supplying air to the lower part of the separation membrane module 3, a drain valve 13 that is opened when discharging water to be treated or cleaning drainage on the primary side of the separation membrane module 3, a treated water feed valve 14 to the primary side, a water to be treated bypass valve 15, a primary side feed pressure sensor (P1) 16, a primary side outlet pressure sensor (P3) 17, and a secondary side pressure sensor (P2) 18 are provided. Water to be treated is a solution to be treated using a separation membrane module, and examples thereof include river water, groundwater, seawater, sewage treated water, industrial wastewater, and culture solution.

The pore size of the separation membrane used in the separation membrane module 3 is not particularly limited as long as the membrane is porous, but depending on the desired property or amount of water to be treated, an MF membrane (microfiltration membrane) may be used, a UF membrane (ultrafiltration membrane) may be used, or both may be used in combination. For example, in the case of intending to remove suspended components, *Escherichia coli, cryptosporidium*, etc., either an MF membrane or a UF membrane can be used, but in the case of intending to ane, in which a clogging location of the separation membrane module is determined from a resistance in a lower part of the separation membrane module, a filtration resistance of a hollow-fiber membrane, and a resistance any of these can be used. The material of the separation membrane preferably contains at least one selected from the group consisting of polyethylene, polypropylene, polyacrylonitrile, an ethylene-tetrafluoroethylene copolymer, polychlorotrifluoroethylene, polytetrafluoroethylene, polyvinyl fluoride, a tetrafluoroethylene-hexafluoropropylene copolymer, a tetrafluoroethylene-perfluoroalkyl vinyl ether copolymer, a chlorotrifluoroethylene-ethylene copolymer, polyvinylidene fluoride, polysulfone, cellulose acetate, polyvinyl alcohol, polyether sulfone, and an inorganic material such as ceramics. Of these, polyvinylidene fluoride (PVDF) is more preferred in view of membrane strength and chemical resistance, and polyacrylonitrile is more preferred for the reason that the hydrophilicity is high and the contamination resistance is strong. In addition, the separation membrane of the separation membrane module 3 is inserted into a case, and the case has at least a water to be treated feed nozzle, a water to be treated discharge nozzle, and a treated water discharge nozzle for discharging water to be treated which has been treated. The shape of the case may be either a barrel shape or a polygonal shape.

Incidentally, the "primary side" indicates, in the space partitioned by the separation membrane, the side to which water to be treated is fed, and the "secondary side" is a filtrate side after water to be treated is filtrated by the separation membrane.

Figure 2:
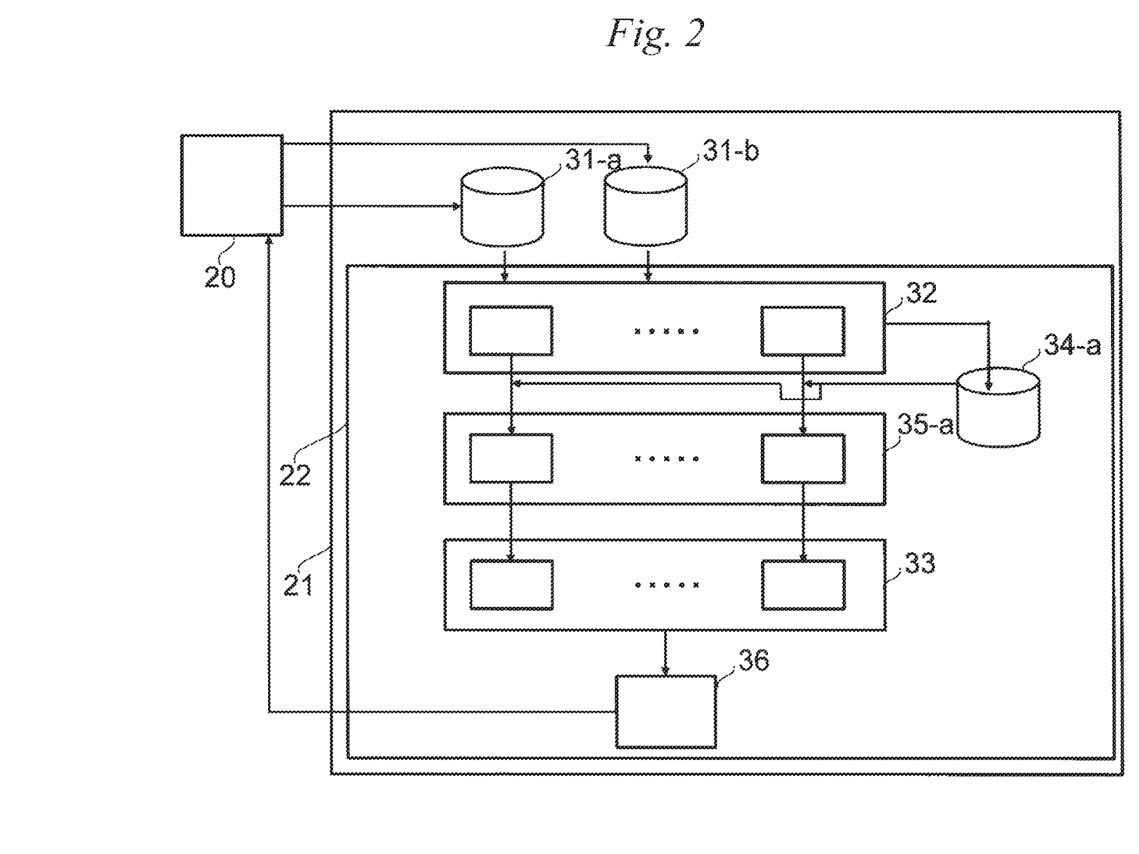
FIG. 2 is a schematic diagram illustrating an embodiment of the present invention.

As regards the clogging location determination in the present invention, for example, as illustrated in FIG. 2, the embodiment is characterized by having the following means. First, a computer 21 obtaining operation data from a fresh water generation system 20 functions as an operation data recording means for recording operation data in a filtration step and a cleaning step, and a clogging location determination program 22 is introduced into the computer 21.

In the fresh water generation system 20, water to be treated is fed to the primary side within the separation membrane module 3 by operating the water to be treated feed pump 1 and opening the water to be treated feed valve 2 and the air vent valve 4. The pressure difference (ΔP1) between the inlet side and the outlet side on the primary side of the separation membrane module in the water to be treated feed step is measured/differentially computed using the primary side feed pressure sensor 16 and the primary side outlet pressure sensor 17 and recorded on a pressure data recording means 31-*a*. After the primary side is filled with water to be treated, filtration by the separation membrane equipped inside the separation membrane module 3 is performed by closing the air vent valve 4 and opening the treated water discharge valve 5. The process moves to a filtration step of transferring treated water to the treated water storage tank 6 via the treated water discharge valve 5 from the secondary side within the separation membrane module 3. In the case of dead-end filtration, all of the air vent valve 4, the backwashing valve 8, the air scrubbing valve 12, and the drain valve 13 are closed. The pressure difference between the primary side and the secondary side (referred to as "filtration differential pressure") (ΔP2) of the separation membrane module at the start of filtration step is measured/differentially computed using the primary side feed pressure sensor 16 and the secondary side pressure sensor 18 and recorded on a pressure data recording means 31-*a*. In addition, the filtration flow velocity at the time of filtration step is recorded on a filtration flow velocity data recording means 31-*b*.

The filtration system includes a dead-end filtration system and a cross-flow filtration system. In the cross-flow filtration system, the air vent valve 4 is not fully closed at the time of filtration step, and filtration is performed while draining a part of water to be treated from the primary side of the separation membrane module. The system may be either filtration system, but a dead-end filtration module is preferred in view of low energy consumption. Along with the elapsed filtration time, filtration resistance of the separation membrane, i.e., filtration differential pressure ($\Delta P2$), increases. In order to suppress this increase, it is common practice to periodically perform physical cleaning and execute the operation while repeating filtration and physical cleaning. In addition, it is preferable to appropriately set the filtration time according to the property of water to be treated or the membrane filtration flux, but generally employed is a method of periodically performing physical cleaning once the filtration time of 10 to 120 minutes, or a method of continuing the filtration time until reaching a predetermined differential pressure of membrane filtration.

In the physical cleaning, filtration is temporarily stopped, and a backwashing step, an air scrubbing step, a draining step, and a water feed step are generally conducted in this order, but there is no problem even when a backwashing step and an air scrubbing step are conducted simultaneously, a backwashing step is conducted after a draining step, or any step is omitted or conducted a plurality of times.

After the completion of the filtration step, the process moves to a backwashing step by stopping the water to be treated feed pump 1, closing the water to be treated feed valve 2 and the treated water discharge valve 5, opening the backwashing valve 8 and the air vent valve 4, and operating the backwashing pump 7. The pressure difference ($\Delta P3$) between the inlet side and the outlet side on the primary side of the separation membrane module or the pressure difference ($\Delta P3'$) between the secondary side and the primary side of the separation membrane module, at the start of the backwashing step, is measured/differentially computed using the primary side feed pressure sensor 16, the secondary side pressure sensor 18 and the primary side outlet pressure sensor 17 and recorded on a pressure data recording means 31. As the backwashing water, although not particularly limited, it is preferable to use treated water obtained by filtrating water to be treated by the separation membrane module as in this embodiment, but industrial water, clean water, tap water, RO membrane permeate, or pure water may also be used. The backwashing time is not particularly limited but is preferably from 1 to 120 seconds. If the time spent in one backwashing is less than 1 seconds, sufficient cleaning effect is not obtained. If it exceeds 120 seconds, the process includes, for example, a water feed step for 1 minute, a filtration step for 30 minutes, a backwashing step for 5 minutes, an air scrubbing step for 1 minute, and a draining step for 1 minute, and the time excluding the filtration step accounts for 20% or more of the total, leading to a reduction in the operation rate of the separation membrane module and in the water recovery ratio.

After the completion of the backwashing step, the process moves to an air scrubbing step by stopping the backwashing pump 7, closing the backwashing valve 8, opening the air scrubbing valve 12, and operating the air blower 11 to supply air to the separation membrane module 3, thereby performing cleaning. The air scrubbing time is not particularly limited but is preferably from 1 to 120 seconds. If the time spent in one air scrubbing is less than 1 seconds, sufficient cleaning effect is not obtained. If it exceeds 120 seconds, the operation rate of the separation membrane module is reduced. During the course of the backwashing step, an air scrubbing step may be introduced by opening the air scrubbing valve 12 and operating the air blower 11.

After the completion of the air scrubbing step, the process moves to a draining step of fully draining cleaning drainage accumulated within the separation membrane module 3 by stopping the air blower 11, closing the air scrubbing valve 12, and opening the drain valve 13. Thereafter, the process returns to the water to be treated feed step, and the membrane filtration operation is continued.

The above-described water to be treated feed step, filtration step, backwashing step, air scrubbing step and draining step are taken as a filtration cycle, and an arithmetic processing is performed by a difference computing means 32 using the resistance calculated based on the pressure difference of the separation membrane module in the water to be treated feed step, the resistance calculated based on the pressure difference of the separation membrane module at the start of the filtration step, and the resistance calculated based on the pressure difference on the primary side of the separation membrane module at the start of the backwashing step (third resistance R3).

The specific method includes, for example, a computation method 1, a computation method 2, and a computation method 3. In the computation method 1, (R1−R3), R2−(R1−R3) and R3 are arithmetically processed using the difference in the resistance between the inlet side and the outlet side on the primary side of the separation membrane module in a water to be treated feed step (first resistance R1), the difference in the resistance between the inlet side on the primary side and the secondary side of the separation membrane module at the start of the filtration step (second resistance R2), and the difference in the resistance between the inlet side and the outlet side on the primary side of the separation membrane module at the start of the backwashing step (third resistance R3). In the computation method 2, (R1+R2)−R3', (R1+R3')−R2 and (R2+R3')−R1 are arithmetically processed using the first resistance R1, the second resistance R2, and the difference in the resistance between the secondary side and the outlet side on the primary side of the separation membrane module at the start of the backwashing step (third resistance R3'). In the computation method 3, R1−R4, R2−R4 and R4 are arithmetically processed using the first resistance R1, the second resistance R2, and the resistance on the inlet side of the primary side of the separation membrane module during the draining step (fourth resistance R4).

Each resistance is calculated according to R1=$\Delta P1$=P1−P3, R2=$\Delta P2$=P1−P2, R3=$\Delta P3$ (at the start of backwashing)= P1−P3, R3'=$\Delta P3'$=P2−P1, and R4 (during the draining step)= P1. Incidentally, in the case of constant flow rate filtration, a resistance calculation based on pressure data can be performed. On the other hand, in the case where the flow rates in all of the water to be treated feed step, the filtration step and the backwashing step are not conformed, correction by the flow rate needs to be conducted. In this case, pressure difference/flow rate is preferably computed. In the case of constant pressure filtration, it is better as well to perform a resistance calculation based on flow rate data and pressure data and compute pressure difference/flow rate in each of the water to be treated feed step, the filtration step, the backwashing step, and the draining step. As for the flow rate during the draining step, another appropriate correction may be performed, if desired, so as to calculate the resistance value. The present inventors have found that by performing the above-described arithmetic processing, clogging of the separation membrane module can be divided into three groups, i.e., an increase of the resistance due to accumulation at the water to be treated supply port or in the lower part of the separation membrane module, an increase of the resistance due to clogging of the separation membrane, and an increase of the resistance due to accumulation at the water to be treated outlet or in the upper part of the separation membrane module.

For example, the computing operation (R1−R3), R1+R2−R3' or R4 indicates an increase of the resistance at the water to be treated supply port or in the lower part of the separation membrane module. As for the computing operation (R1−R3), R1 indicates the resistance in the upper and lower parts of the separation membrane module, R3 indicates the resistance in the upper part of the separation membrane module, and therefore, an increase of the resistance at the water to be treated supply port or in the lower part of the separation membrane module can be calculated by taking the difference therebetween. As for the computing operation R1+R2−R3', R1 indicates the resistance in the upper and lower parts of the separation membrane module, R2 indicates the clogging in the lower part of the separation membrane module as well as in the separation membrane, R3' indicates the resistance of clogging in the upper part of the separation membrane module as well as in the separation membrane, and therefore, an increase of the resistance at the water to be treated supply port or in the lower part of the separation membrane module can be calculated by performing the computing operation above. In addition, R4 indicates the clogging in the lower part of the separation membrane module and therefore, an increase of the resistance at the water to be treated supply port or in the lower part of the separation membrane module can be calculated from R4. Similarly, R3, (R1+R3')−R2 or R1−R4 indicates an increase of the resistance at the water to be treated outlet or in the upper part of the separation membrane module, R2−(R1−R3), (R1+R3')−R2 or R2−R4 indicates an increase of the resistance due to clogging of the separation membrane, and therefore, the clogging location within the separation membrane module can be determined by performing the computing operations above. The frequency of the computing operation above is not particularly limited, but the operation may be performed every each filtration cycle. Furthermore, although not particularly limited, the upper part of the separation membrane module indicates a portion of 70% or more from the water to be treated feed side relative to the length direction of the separation membrane module, and the lower part of the separation membrane module indicates a portion of 30% or less from the water to be treated feed side relative to the length direction of the separation membrane module. In the case of using a hollow-fiber membrane, the water to be treated feed side is often the lower side with respect to the direction of gravitational force and therefore, the portions are described in this way.

When the variation from the initial value of the value obtained by the computing operation above is recorded on the variation recording means 34-a and the variation from the initial value of the resistance in the lower part of the separation membrane module is compared with the variation from the initial value of the resistance in the upper part of the separation membrane module and the variation from the initial value of the resistance due to clogging of the separation membrane of the separation membrane module by the variation comparison means 35-a and found to be largest, the clogging location determination means 33 decides that the water to be treated supply port and/or the lower part of the separation membrane module is the clogging part, and cleaning of the lower part of the separation membrane module must be prioritized compared with other locations.

Figure 3:
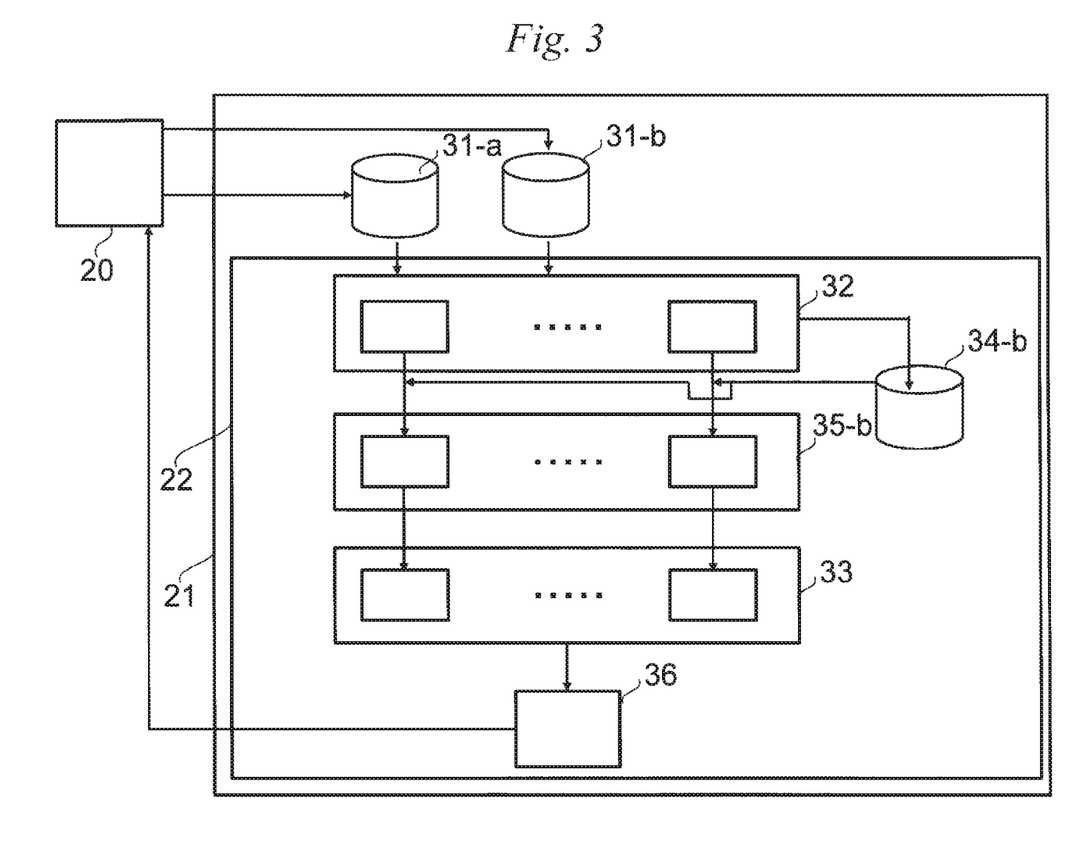
FIG. 3 is a schematic diagram illustrating an embodiment of the present invention.

As the prioritized cleaning, it is effective to cause the control means 36 to lower the water level by opening the air vent valve 4 and the drain valve 13 until the ambience around the separation membrane on the primary side becomes gaseous and then conduct at least one of control a of closing the drain valve 13, opening the backwashing valve 8 and the air scrubbing valve 12, and executing cleaning of performing air scrubbing while making the liquid level on the primary side to fluctuate up and down, control b of increasing the process time of the draining step, and control c of performing, in the draining step, pressure draining of draining water by pressurizing the primary side of the separation membrane module with air or performing backwashing lower-part draining of draining water by closing the air vent valve 4, opening the backwashing valve 8 and the drain valve 13, and operating the backwashing pump 7. Each control may be performed only once or may be conducted a plurality of times. Control a can impart an effect of causing disappearance of air bubbles at the air-liquid interface or a cleaning effect by large variation in the liquid level due to rupture of air bubbles and can efficiently clean the water to be treated supply port and/or the lower part of the separation membrane module. The initial value indicates the value in the arithmetic processing at the start of the filtration cycle operation or at the start of operation after chemical cleaning or in the previous arithmetic processing. In addition, instead of comparing the variation from the initial value of the value obtained by the computing operation above, the comparison may be performed by recording the change rate on the change rate recording means 34-b as illustrated in FIG. 3 and comparing respective change rates with use of the change rate comparison means 35-b.

Similarly, when the variation from the initial value of the value obtained by the computing operation above is recorded on the variation recording means 34-a and the variation from the initial value of the resistance in the upper part of the separation membrane module is compared with the variation from the initial value of the resistance in the lower part of the separation membrane module and the variation from the initial value of the resistance due to clogging of the separation membrane of the separation membrane module by the variation comparison means 35-a and found to be largest, the clogging location determination means 33 decides that the water to be treated outlet and/or the upper part of the separation membrane module is the clogging part, and cleaning of the upper part of the separation membrane module must be prioritized compared with other locations.

As the prioritized cleaning, it is effective to cause the control means 36 to conduct at least one of control d of opening the water to be treated bypass valve 15, the air vent valve 4 and the drain valve 13, and feeding water to be treated in a reverse direction through a nozzle used for discharging cleaning drainage, and control e of discharging and emptying water on the primary side of the separation membrane module by opening the drain valve 13 and the air vent valve 4, and then cleaning the separation membrane module by operating the backwashing pump 7 while keeping the backwashing valve 8 and the drain vale 13 open. As for the control d, it is preferable to feed water to be treated as in this embodiment, but treated water, industrial water, tap water, or RO membrane permeate may also be used. The water to be treated outlet and/or the upper part of the separation membrane module can be efficiently cleaned by feeding water to be treated in a reverse direction through a nozzle used for discharging cleaning drainage. In addition, instead of comparing the variation from the initial value of the value obtained by the computing operation above, the comparison may be performed by recording the change rate on the change rate recording means 34-$b$ as illustrated in FIG. 3 and comparing respective change rates with use of the change rate comparison means 35-$b$.

Similarly, when the variation from the initial value of the value obtained by the computing operation above is recorded on the variation recording means 34-$a$ and the variation from the initial value of the resistance due to clogging of the separation membrane of the separation membrane module is compared with the variation from the initial value of the resistance in the upper part of the separation membrane module and the variation from the initial value of the resistance in the lower part of the separation membrane module by the variation comparison means 35-$a$ and found to be largest, the clogging location determination means 33 decides that the separation membrane is the clogging part, and cleaning of the separation membrane of the separation membrane module must be prioritized compared with other locations.

As the prioritized cleaning, it is effective to cause the control means 36 to conduct at least one of control f of conducting chemical enhanced cleaning of feeding a chemical solution from the secondary side to the separation membrane module 3 by operating the chemical solution feed pump 9 during the backwashing step, control g of changing at least one of the backwashing time and the air scrubbing time, and control h of changing at least one of the backwashing flow rate in the backwashing step and the air amount in the air scrubbing step.

In addition, instead of comparing the variation from the initial value of the value obtained by the computing operation above, the comparison may be performed by recording the change rate on the change rate recording means 34-$b$ as illustrated in FIG. 3 and comparing respective change rates with use of the change rate comparison means 35-$b$. In order to more increase the cleaning effect, a time for which the chemical solution is put into contact with the separation membrane may also be provided. The preferable contact time is approximately from 5 minutes to 3 hours. Because, if the contact time is too long, the time during which the fresh generation system 20 is stopped is increased, and the operation efficiency of the fresh water generation system 20 drops. Here, the chemical solution used for cleaning can be selected after appropriately setting the concentration and contact time to such a degree as not deteriorating the membrane, but it is preferable to contain at least one or more of sodium hypochlorite, chlorine dioxide, hydrogen peroxide, ozone, etc., because the cleaning effect on organic matter increases. In addition, it is preferable to contain one or more of hydrochloric acid, sulfuric acid, nitric acid, citric acid, oxalic acid, etc., because the cleaning effect on, for example, aluminum, iron and manganese increases. The concentration of the chemical solution is preferably from 5 to 10,000 mg/L, because if the concentration is less than 5 mg/L, the cleaning effect is insufficient, whereas if it exceeds 10,000 mg/L, the cost of the chemical solution rises, which is unprofitable. As for the chemical solution, using two or more kinds of chemical solutions in order is more preferable than using one kind of chemical solution, and it is more preferable to alternately use, for example, an acid and sodium hypochlorite. The chemical solution is preferably fed from the secondary side to the separation membrane module 3 as in this embodiment, but the chemical solution may be fed from the primary side to the separation membrane module 3. The clogging of the separation membrane can be efficiently cleaned by performing chemical enhanced cleaning.

Furthermore, in order to determine the clogging location of the separation membrane module by analyzing the data of the cleaning step (backwashing, air scrubbing, draining, water to be treated feeding) that is conducted usually in a short time relative to the filtration time, the period with which data is collected (sometimes referred to as sampled, acquired or recorded) must be set to a short time, but the server capacity is pressed due to an increase in the storage (recording) amount of operation data, giving rise to a problem that the data recording period cannot be set short. Accordingly, it is also a preferred embodiment to further provide a recording period setting means for distinguishing respective operation data of the filtration step and cleaning step and setting the period to different recording periods.

The recording period setting means may arbitrarily set the recording period in a unit of several tens of seconds to several hours as long as it is in the filtration step, but in order to prevent the server capacity from being pressed, the recording period is preferably set to 1 minute or more. However, the cleaning time itself in the cleaning step is short compared with the filtration step, and data cannot be acquired with the same recording period as that in the filtration step. For this reason, the recording period in the cleaning step is preferably set in a unit of several seconds to several tens of seconds and for analyzing the data so as to determine the clogging location of the separation membrane module, is more preferably set to 5 seconds or less. In this way, operation data acquisition in each step is reduced to a necessary minimum, and the server capacity can thereby be prevented from being pressed. Moreover, in the case of an embodiment where the operation data is acquired via the internet, the communication cost can also be saved.

Figure 4:
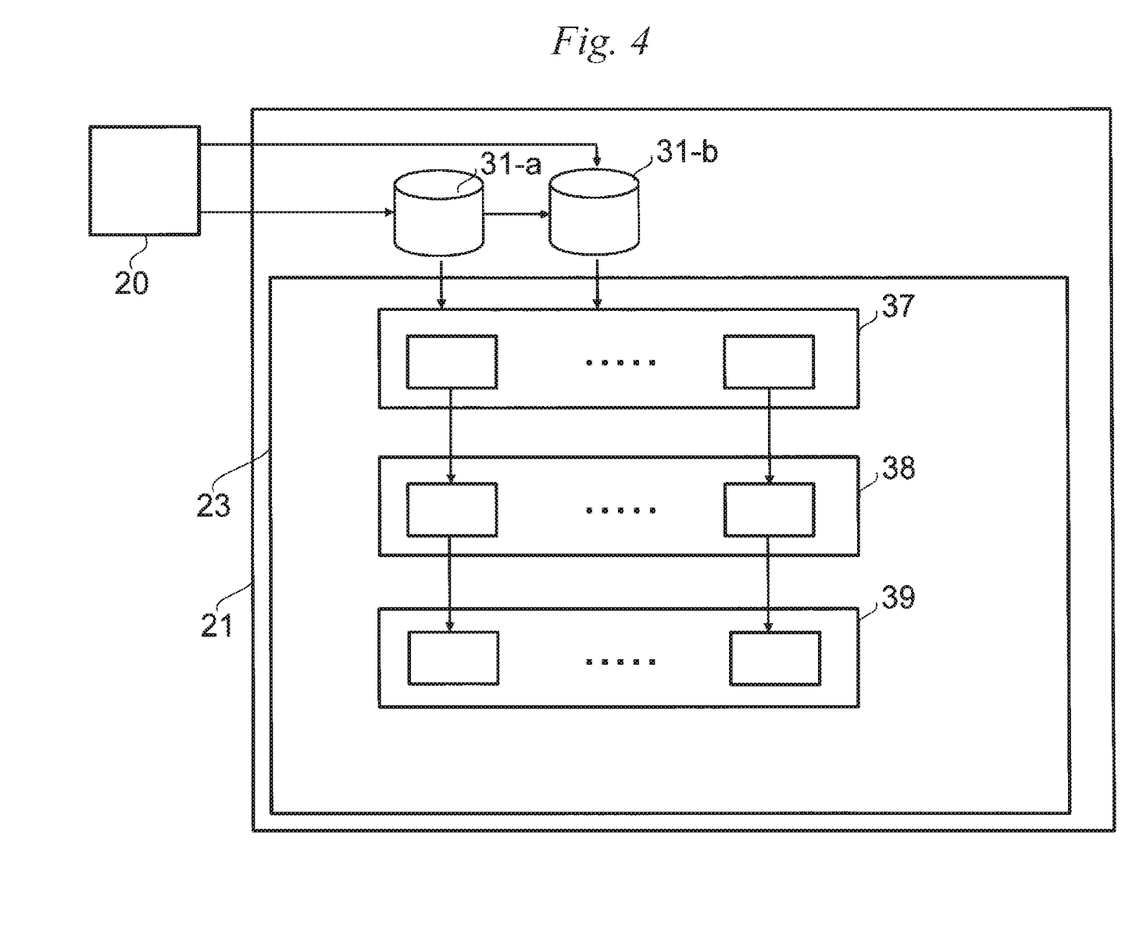
FIG. 4 is a schematic diagram illustrating an embodiment of the present invention.
Figure 5:
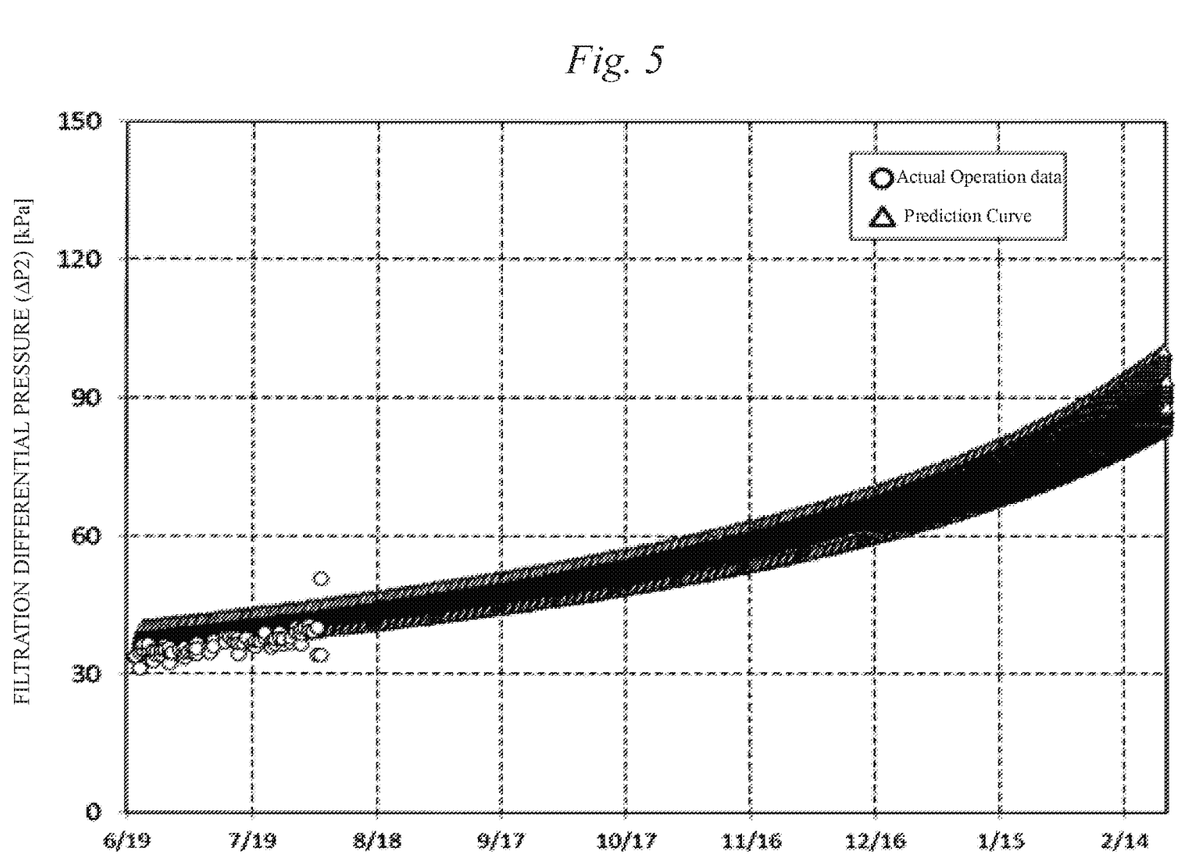
FIG. 5 is a diagram illustrating a prediction curve of the present invention.

Furthermore, the present invention is characterized in that in addition to the above-described clogging location determination program, as illustrated in FIG. 4, the computer 21 further includes a control program 23 having the means in the lower column. The program has an analysis means 37 for analyzing the filtration index from the change in the filtration differential pressure ($\Delta P2$) and the change in the filtration flow velocity, and a filtration characteristic change prediction means 38 having a mechanism of analyzing the past data, calculating the past change portion of each data from the filtration indexes obtained by the analysis means, and predicting the rate at which the filtration characteristics such as filtration flow velocity and filtration pressure are changed. Consequently, the period until chemical cleaning or replacement of the separation membrane module 3 can be predicted by a chemical cleaning date or replacement date prediction means 39. In addition, as illustrated in FIG. 5, a prediction curve of the filtration differential pressure ($\Delta P2$) output by the prediction means is graphically displayed, and the operation condition of the separation membrane module 3 can thereby be easily decided. The filtration index includes a degree of filtration resistance increase of one cycle and a degree of physical cleaning irreversible filtration resistance increase after the completion of physical cleaning. Here, the degree of filtration resistance increase of one cycle is the filtration resistance increased in one cycle of the filtration step, and the filtration resistance is calculated according to the following calculating formula and is an index indicating the degree of membrane fouling.

Filtration resistance (1/m)=filtration differential pressure (Pa)/(viscosity of filtrate (Pa·s)×filtration flow velocity (m/s))

On the other hand, the degree of physical cleaning irreversible filtration resistance increase after physical cleaning is also an index indicating the degree of membrane fouling, but this index indicates a component that is not removed even by conducting physical cleaning, and when the total filtrate amount (m$^3$/m$^2$) and the filtration resistance (1/m) are plotted on the abscissa and the ordinate, respectively, the index indicates the slope of a straight line drawn by connecting the filtration resistance at the start of each filtration step. Furthermore, a prediction curve output by the prediction means is graphically displayed, and the operation condition of the separation membrane module 3 can thereby be easily decided. As for the prediction above, it is preferable to periodically make a new prediction according to the change of the filtration flow velocity data or filtration pressure data. The period is not particularly limited but is preferably about once in several hours to several days. In addition, when the graphical displaying above shows that the number of days until the chemical cleaning date or replacement date is smaller than that until the preset designated date, a warning alarm is output or notified by e-mail, etc. to the administrator, so that preparation for chemical cleaning or replacement can be made in advance and the shutdown time can be minimized. Alternatively, the program may have a function of giving a warning alarm when the chemical cleaning date or replacement date occurs earlier than the scheduled date.

Incidentally, each of the recording means above may be a means not only recording the named data itself but also recording other information capable of calculating the named data. For example, the "change rate recording means" may not only be a means recording the change rate itself but may also be a means recording the temporal measurement interval and the variation during the interval, and this can be a change rate recording means, because the change rate can be calculated from these.

This application is based on Japanese Patent Application No. 2016-154212 filed on Aug. 5, 2016 and Japanese Patent Application No. 2016-157225 filed on Aug. 10, 2016, the contents of which are incorporated herein by way of reference.

DESCRIPTION OF REFERENCE NUMERALS AND SIGNS

1: Water to be treated feed pump
2: Water to be treated feed valve
3: Separation membrane module
4: Air vent valve
5: Treated water discharge valve
6: Treated water storage tank
7: Backwashing pump
8: Backwashing valve
9: Chemical solution feed pump
10: Chemical solution storage tank
11: Air blower
12: Air scrubbing valve
13: Drain valve
14: Treated water feed valve
15: Water to be treated bypass valve
16: Primary side feed pressure sensor (P1)
17: Primary side outlet pressure sensor (P3)
18: Secondary side pressure sensor (P2)
20: Fresh water generation system
21: Computer
22: Clogging location determination program
23: Control program
31-$a$: Pressure data recording means
31-$b$: Filtration flow velocity data recording means
32: Difference computing means
33: Clogging location determination means
34-$a$: Variation recording means
34-$b$: Change rate recording means
35-$a$: Variation comparison means
35-$b$: Change rate comparison means
36: Control means
37: Analysis means
38: Filtration characteristic change prediction means
39: Chemical cleaning date or replacement date prediction means

The invention claimed is:

1. A fresh water generation method for obtaining treated water by filtrating water to be treated by a separation membrane module having a separation membrane, comprising the steps of:
feeding water to be treated to a primary side of the separation membrane module;
measuring and obtaining a difference in a resistance between an inlet side and an outlet side on the primary side of the separation membrane module in the step of feeding, as being a first resistance R1;
performing a filtration step by pressure-feeding water to be treated from the primary side to a secondary side of the separation membrane module;
measuring and obtaining a difference in a resistance between the inlet side on the primary side and the secondary side of the separation membrane module in the filtration step, as being a second resistance R2;
performing a backwashing step by performing permeation from the secondary side to the primary side of the separation membrane module;
measuring and obtaining a difference in a resistance between the inlet side and the outlet side on the primary side of the separation membrane module in the backwashing step, as being a third resistance R3;
determining a clogging location of the separation membrane module from a resistance in a lower part of the separation membrane module, a filtration resistance of a hollow-fiber membrane, and a resistance in an upper part of the separation membrane module, comprising the sub-step of:
determining as to which location is clogged among the lower part of the separation membrane module, the hollow-fiber membrane, and the upper part of the separation membrane module based on computing operations of R1−R3 and R2−(R1−R3) using the first resistance R1, the second resistance R2 and the third resistance R3;
prioritizing the determined clogging location to be cleaned compared with other locations; and
cleaning the determined clogging location.

2. The fresh water generation method according to claim 1, further comprising the step of:
measuring and obtaining a difference in a resistance between the secondary side and the outlet side on the primary side of the separation membrane module in the backwashing step, as being a third resistance R3', wherein the step of determining the clogging location further comprises determining the clogging location based on computing operations of (R1+R2)−R3′, (R1+R3′)−R2 and (R2+R3′)−R1 using the first resistance R1, second resistance R2 and third resistance R3′.

3. The fresh water generation method according to claim 1, wherein, in the difference computing operation, the first resistance R1, the second resistance R2 and the third resistance R3 are calculated based on pressure data.

4. The fresh water generation method according to claim 2, wherein, in the difference computing operation, the first resistance R1, the second resistance R2 and the third resistance R3′ are calculated based on pressure data.

5. The fresh water generation method according to claim 1, wherein a variation or a change rate from an initial value of R1−R3, a variation or a change rate from an initial value of R2−(R1−R3), and a variation or a change rate from an initial value of R3 are calculated, and when the variation or the change rate from the initial value of R1−R3 is larger than the variation or the change rate from the initial value of R2−(R1−R3) and the variation or the change rate from the initial value of R3, the lower part of the separation membrane module is determined as a clogging location, and at least one of control a of performing air scrubbing while making a liquid level on the primary side within the separation membrane module to fluctuate up and down, control b of increasing a process time of a draining step, and control c of performing, in the draining step, pressure draining of draining water by pressurizing the primary side of the separation membrane module with air, is conducted.

6. The fresh water generation method according to claim 1, wherein a variation or a change rate from an initial value of R1−R3, a variation or a change rate from an initial value of R2−(R1−R3), and a variation or a change rate from an initial value of R3 are calculated, and when the variation or the change rate from the initial value of R3 is larger than the variation or the change rate from the initial value of R1−R3 and the variation or the change rate from the initial value of R2−(R1−R3), the upper part of the separation membrane module is determined as a clogging location, and at least one of control d of feeding water to be treated in a reverse direction through a nozzle of the separation membrane module, which is used for discharging cleaning drainage, and control e of cleaning the separation membrane module by operating a backwashing pump after discharging and emptying water on the primary side of the separation membrane module, is conducted.

7. The fresh water generation method according to claim 1, wherein a variation or a change rate from an initial value of R1−R3, a variation or a change rate from an initial value of R2−(R1−R3), and a variation or a change rate from an initial value of R3 are calculated, and when the variation or the change rate from the initial value of R2−(R1−R3) is larger than the variation or the change rate from the initial value of R1−R3 and the variation or the change rate from the initial value of R3, the hollow-fiber membrane is determined as a clogging location, and at least one of control f of conducting cleaning of the separation membrane module by feeding a chemical solution to the separation membrane module, control g of changing at least one of a backwashing time and an air scrubbing time, and control h of changing at least one of a backwashing flow rate in the backwashing step and an air amount in an air scrubbing step, is conducted.

* * * * *